Patented Jan. 1, 1924.

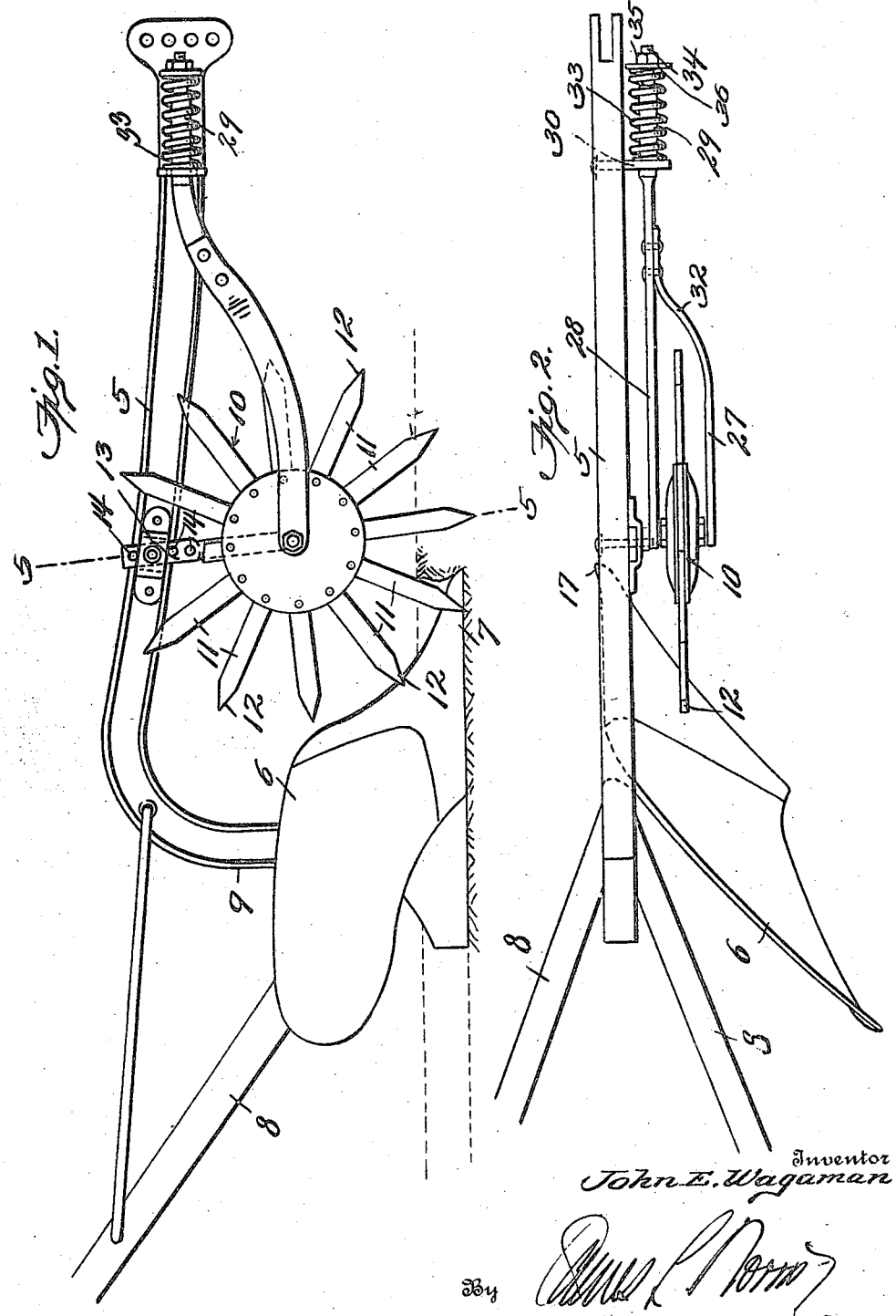

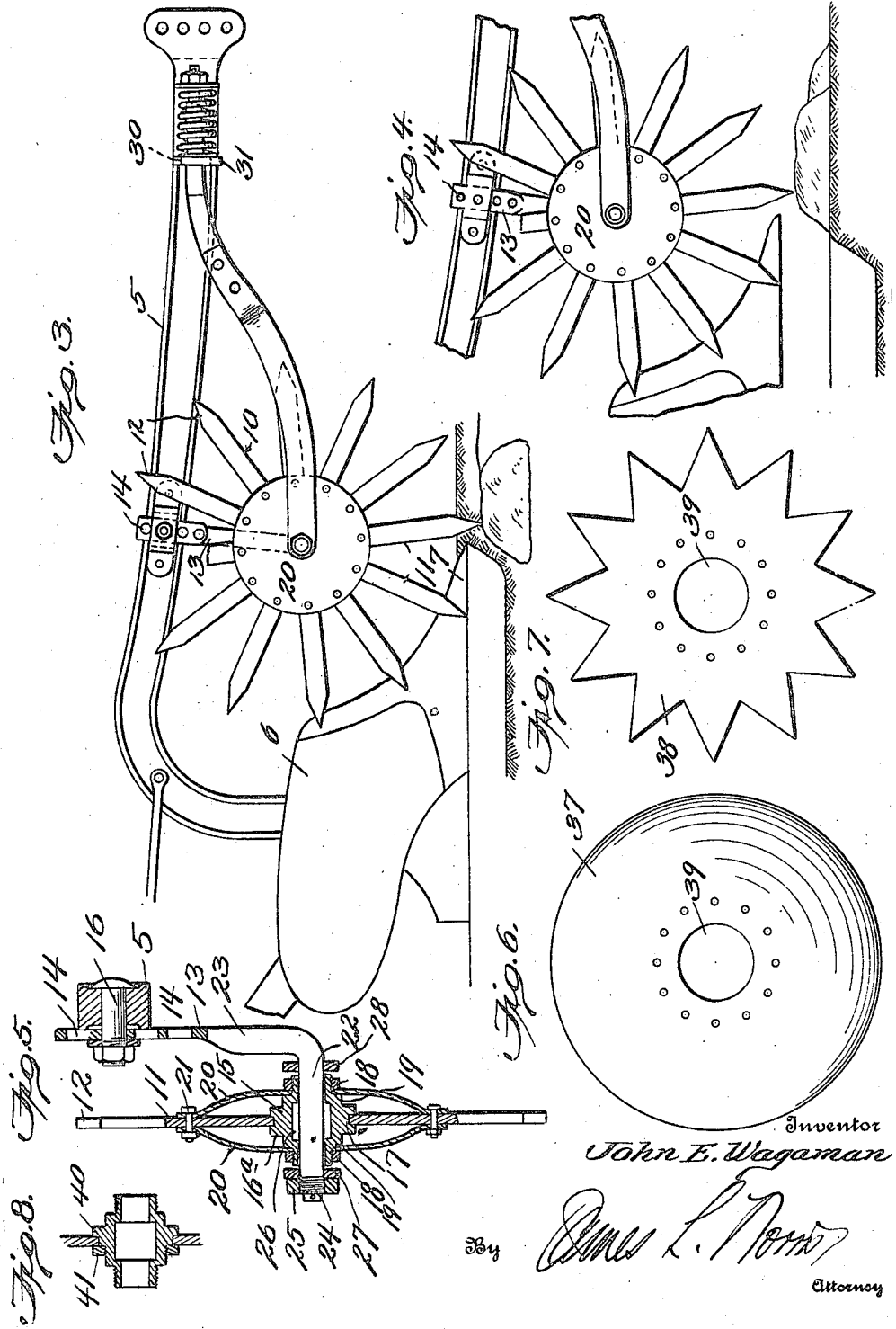

1,479,210

UNITED STATES PATENT OFFICE.

JOHN E. WAGAMAN, OF HAGERSTOWN, MARYLAND.

PLOW ATTACHMENT.

Application filed June 7, 1922. Serial No. 566,646.

*To all whom it may concern:*

Be it known that I, JOHN E. WAGAMAN, a citizen of the United States, residing at Hagerstown, in the county of Washington and State of Maryland, have invented new and useful Improvements in Plow Attachments, of which the following is a specification.

This invention relates to an automatically operating attachment for a plow or other cultivating device to which it may be applicable.

The primary object of the invention is to provide a fender or protector that may be readily applied to and operate in connection with any form of plow or cultivator to lift the latter over stones or obstructions located either below or above the ground surface for the purpose of avoiding impedance to the forward movement of the plow or cultivator and also to prevent injury to the plow point, cultivator shovel or other device.

The improved attachment performs its work equally well below or above the ground surface, or when it engages imbedded rocks, roots or other obstructions, or projecting devices above the ground, and is so arranged and operable from a standpoint of adjustment that it may at all times be caused to penetrate and remain under the ground surface ready for engagement with any obstruction in advance of a plow point or cultivator shovel, or it may similarly operate relatively to an obstruction above the ground surface, the improved attachment being capable of application to single plows and cultivating organizations generally now in use wherein a plurality of plows or shovels are used as well known in the art of agriculture machinery.

The preferred essential feature of the present improved attachment consists of a wheel that may be varied in its construction, or be of either a radial arm, circular disk, or star-like form of such strength and durability as to withstand the momentum and weight of the whole implement to which it is applied and so placed that it will invariably strike an obstruction prior to engagement with the point of the plow or cultivating device. The improved attachment in its preferred wheel form is also adjustably mounted to regulate the depth of penetration thereof in accordance with the penetration of the plow or cultivating device, or relatively to the ground surface, the improved attachment having a free rotation so that the peripheral portions thereof may easily run below or on the ground surface, and also has a swinging or shifting mounting to minimize sudden impact or jar thereon when it engages the obstruction to the plow or cultivating device.

The invention also consists in the construction and arrangement of the several parts which will be more fully hereinafter described and claimed.

In the drawings:

Fig. 1 is a side elevation of a plow of the moldboard type, showing the improved attachment applied thereto and partially imbedded in the ground, the latter being shown in section;

Fig. 2 is a top plan view of the plow and improved attachment;

Fig. 3 is a view similar to Fig. 2 of a portion of the plow showing the operation of the attachment when engaging an imbedded obstruction and illustrating the plow as lifted to clear the obstruction;

Fig. 4 is a view similar to Fig. 3 of a portion of the plow and attachment, showing the attachment operating in conjunction with a surface projection and illustrating the plow as lifted from the furrow to clear such obstruction;

Fig. 5 is a transverse vertical section slightly enlarged on the line 5—5, Fig. 1;

Figs. 6 and 7 are detail views of different forms of wheels adapted to be substituted for the wheel shown by Figs. 1 to 5, inclusive; and Fig. 8 is a detail transverse vertical section particularly showing a modification of the wheel hub to adapt the same to receive the forms of wheels shown by Figs. 6 and 7.

The improved attachment is shown in the accompanying drawings as being applied to the beam of an ordinary moldboard plow, but as hereinbefore indicated, it may be applied to a gang plow or a beam carrying a series of cultivating devices, and the illustration of the improved attachment in connection with a single plow of the moldboard type and its beam is solely for the purpose of demonstrating one practical application of the improvement. It is obvious that where the improved attachment is used in connection with a gang plow or beam carrying a series of cultivating devices, the number of the attachments used would be but a simple duplication with the same object and function in view.

Referring to the drawings, the numeral 5 designates a plow beam having a plow 6 associated therewith of the usual moldboard type and provided with a point 7, the plow illustrated also having handles 8 connected to the beam or the depending standard 9 of the latter.

The improved attachment consists of a rotary or wheel-like device 10 which as shown by Figs. 1 to 5, inclusive, comprises a series of radial arms 11 with outer pointed ends 12. The rotary or wheel-like device 10 is suspended from the plow beam 5 through the medium of a hanger 13 formed with a plurality of openings 14 for vertical adjustment in a box-clip 15 secured to one side of the plow beam, a nutted adjusting bolt 16 being removably inserted through the clip and beam and any one of the plurality of openings 14 of the hanger 13 in accordance with the adjustment of the latter.

The preferred specific form of rotary or wheel-like device shown by Figs. 1 to 5, inclusive, comprises in addition to the radial arms 11 with pointed ends 12 a hub 15 with a centrally located circumferential rib or boss 16$^a$ formed with sockets 17 to receive the inner ends of the radial arms 11, as clearly shown by Fig. 5. The opposite ends of the hub 15 are reduced and threaded as at 17 to receive securing nuts 18, and between these nuts and the adjacent shoulders 19 of the hub securing disks 20 are mounted and have their outer converging ends secured to the several arms 11 by removable nutted bolts 21. The disks 20 are preferably of the form shown by Fig. 5 and fully enclose the central part of the hub 15 and the inner extremities of the arms 11 as shown by Figs. 1, 3 and 4. The hub with the disks 20 and arms 11 is fitted on a lower right-angular bent stub axle 22 depending from and forming a part of the hanger 13, the said stub axle and the adjacent angular member 23 thereof being made thicker or heavier than the upper part of the hanger which is adjustably applied to the plow beam. The outer end of the angular stub axle 22 is screw-threaded, as at 24, to removably receive a nut 25, and between the inner part of the hub 15 and the said stub axle are roller bearing devices 26 which reduce the friction of the hub relatively to the stub axle and thereby render the rotation of the hub very sensitive as well as reducing the wear between these engaging parts. Extending forwardly and upwardly from the stub axle 22 are a pair of arms 27 and 28, said arms engaging the stub axle respectively between the inner end of the hub 15 and the angular member 23 and the outer end of the hub and the nut 25, the arm 28 being continuous and having an upper preferably enlarged extremity 29 freely movable through a slot 30 in an outstanding guide 31 secured to the beam 5 adjacent to the front end of the latter. The arm 27 is bent inwardly, as at 32, and secured to the arm 28, as clearly shown by Fig. 2, at a suitable distance in rear of the outstanding or outwardly projecting guide 31. The two arms 27 and 28 unitedly constitute a cushioning or shock-absorbing means for the wheel 10 and hanger 13 through the medium of a spring 33 which is mounted on the upper forward extremity 29 of the arm 28 and bears at its rear terminal against the guide 31, the forward end 34 of the extremity 29 being reduced and threaded to receive an adjusting nut 35 which has bearing against a washer 36 providing the front stop for the spring 33. The spring 33 serves as the cushioning means for the wheel 10 and hanger 13 in the movement of the latter parts and always tends to restore said parts to normal position or at a slight forward inclination as shown by Fig. 1.

Instead of the wheel-like device 10 shown by Figs. 1 to 5, inclusive, the disk wheel 37 shown by Fig. 6, or the star wheel 38 shown by Fig. 7, may be used, each of these modified forms of rotary or wheel-like devices having central openings 39 to fit over a shouldered circumferential boss or projection 40 of the modified form of the hub as shown by Fig. 8, the said disk or star wheel being held in applied position to the hub by a ring nut or analogous device 41. The disks 20 will be applied and bolted against the opposite sides of the disk wheel 37 or star wheel 38 in a manner similar to the application of the said disks 20 to the radial arms 11. It is proposed to use any type of wheel or rotary device adapted to carry out the desired function of the improved attachment.

The operation of the improved device is very simple and effective. When the plow point is moved longitudinally in regular course and with the plow body or moldboard or landside in rear thereof performing their usual functions, either of the forms of rotary or wheel-like device as 10, 37 or 38 that may be used will occupy the position shown by Fig. 1, the wheel-like device moving in advance of the plow point 7 either below or above the ground surface in accordance with the adjustment of the hanger 13. When the wheel-like device in either of its forms moves below the ground surface or maximum depth of the furrow, as shown by Fig. 1, it will always be ready and in position to engage any obstruction below the ground surface in advance of the plow point, and likewise, if the wheel-like device in either of its forms is adjusted to move on the ground surface, the said wheel-like device in the latter position will always stand in advance of the plow point and protect and guard the same relatively to surface projections or obstructions. When the wheel-like device of the improved attachment meets an obstruction as shown by Figs. 3 and 4, it moves rearwardly against the resistance of the spring 33 and at the same time the plow beam and plow is forced upwardly such a distance as to effect a clearance of the plow point relatively to the obstruction. As soon as the obstruction is passed, the plow point resumes its normal penetration and the improved attachment is restored to its normal position as shown by Fig. 1 until further obstruction is engaged, when the same operation will ensue.

The improved attachment will be found exceptionally advantageous in all its applications and is comparatively inexpensive in its construction when considered from a standpoint of advantage in preserving the parts of the plow structure.

What is claimed as new is:

1. The combination of a rigidly connected plow device and beam, a protective device for the plow consisting of a rotary wheel provided with suspending means adjustably connected to the beam in advance of the plow device and adjustable and movable independently of the plow device, and means connected to the axis of the wheel and the front extremity of the beam for automatically restoring the wheel to normal position.

2. The combination of a rigidly connected plow device and beam, a rotary protecting means arranged in advance of the plow device and operating relatively to the ground surface in advance of the plow device, suspending means pivotally and adjustably connected to the beam in advance of the plow device and also attached to the axis of the rotary protecting means, and means connected solely to the axis of the plow device and the beam for giving a cushioned resistance to the advance movement of the rotary protecting means and to restore the latter to normal position.

3. The combination of a rigidly connected plow device and beam, a rotary protecting wheel having suspending means connected to the axis thereof and also movably and adjustably attached to the beam to maintain the periphery of the wheel normally on a level with the lower termination of the plow device, and means introduced solely between the axis of the wheel and beam for cushioning the said wheel and restoring it to normal position.

4. The combination of a rigidly connected plow device and beam, a suspending means adjustably and pivotally secured to the beam in advance of the plow device, the suspending means having a lower right-angular stub axle, a tubular hub mounted on the angular stub axle, a rotary wheel device removably mounted on the tubular hub, and cushioning means engaging inner and outer portions of the angular stub axle and also connected to the beam.

5. The combination of a cultivating device having a point, a support to which the cultivating device is rigidly connected, a hanger pivotally and adjustably connected to the support and comprising a lower outwardly projecting right-angular stub axle, a tubular hub mounted over and freely rotatable on the said stub axle, a rotary wheel secured to and uniformly movable with the tubular hub, and a cushioned resistance means having rear members terminally engaging outer and inner portions of the stub axle and partially embracing the wheel device and also having its front extremity movably connected to the support and provided with a controlling spring for yielding to the operation of the wheel device when abnormally moved forward and for restoring the said wheel to normal position.

6. The combination with cultivating means and a support rigidly connected thereto, a rotary wheel disposed in advance of the cultivating means, a hanger pivotally and adjustably connected to the support and on the lower extremity of which the wheel is mounted to freely rotate, the wheel being of a dimension to operatively extend at all times normally below the lowermost portion of the cultivating means, the wheel having a longitudinal swinging movement, and means connected to the hanger and support for cushioning the rotary wheel and restoring the latter to normal position.

7. In an automatically operating attachment for a cultivating means of the class specified, the combination of a support having a cultivating device rigidly held thereby and always remaining in the same position relatively thereto, a rotary protecting wheel movably suspended from the support in advance of the cultivating device and operable to project a portion thereof below the lowermost part of the cultivating device to bodily lift the said device and its support when the wheel engages an obstruction below or above the ground surface to clear the obstruction, and means for resiliently cushioning and for restoring the suspended wheel to normal position respectively when engaging and after engagement with an obstruction.

8. The combination of a rigidly connected cultivating device and support, a suspending means attached to the support in advance of the cultivating device and normally depending at a forward angle of inclination and having a wheel engaging part at its lower extremity, a rotary protecting wheel mounted on the said wheel-engaging part of the suspending means, and a spring-controlled device connected to the wheel-engaging part and to the front extremity of the said support, the suspending means and wheel being automatically shifted rearwardly against the resistance of the spring-controlled device when the wheel engages an obstruction and the wheel thereby given a maximum downward projection to bodily lift the support and cultivating device to cause the latter device to clear the obstruction.

In testimony whereof I have hereunto set my hand in presence of two subscribing witnesses.

JOHN E. WAGAMAN.

Witnesses:
J. WM. ERNST,
WM. E. FOLTZ.